United States Patent [19]
Lyshkow

[11] 3,892,549
[45] July 1, 1975

[54] GAS DILUTION APPARATUS
[75] Inventor: Norman A. Lyshkow, Chicago, Ill.
[73] Assignee: Combustion Equipment Associates Inc., New York, N.Y.
[22] Filed: June 13, 1974
[21] Appl. No.: 478,881

Related U.S. Application Data
[62] Division of Ser. No. 441,170, Feb. 11, 1974, Pat. No. 3,853,516.

[52] U.S. Cl. .............. 55/267; 55/270; 55/316; 55/318; 55/418; 73/28; 73/421.5 A; 73/422 TC
[51] Int. Cl. ............................................ B01d 51/10
[58] Field of Search ............ 55/267, 270, 315, 316, 55/318, 319, 386, 387, 418, 417, 467, 485, 512, 97, 98; 73/19, 28, 421 R, 421.5 R, 421.5 A, 422 GC, 422 TC

[56] References Cited
UNITED STATES PATENTS
3,794,909  2/1974  Smith .............................. 55/270 X
3,811,253  5/1974  Austin et al. ..................... 55/270
3,841,145  10/1974 Boubel .......................... 55/270 X Primary Examiner—Frank W. Lutter
Assistant Examiner—David L. Lacey

[57] ABSTRACT

Gas dilution apparatus for providing a source of a dilute gas containing a pollutant gas component for detection and/or analysis, in which a gas stream containing a pollutant gas is drawn into the apparatus and through first passage means and a trap to a gas scrubbing assembly. A small quantity of the gas stream containing the gaseous pollutant is drawn off from the first passage means by way of a restricted flow passage for admixture with the scrubbed gas from the gas scrubber assembly, with the restricted flow passage including heating means operatively connected thereto to maintain the temperature of the restricted flow passage above the due point of the gas stream.

14 Claims, 5 Drawing Figures

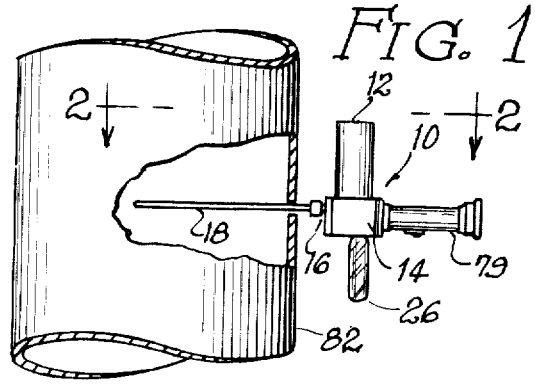
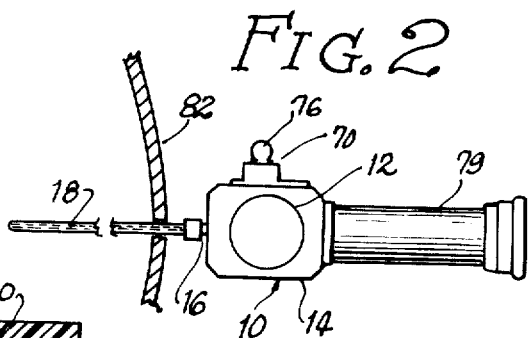
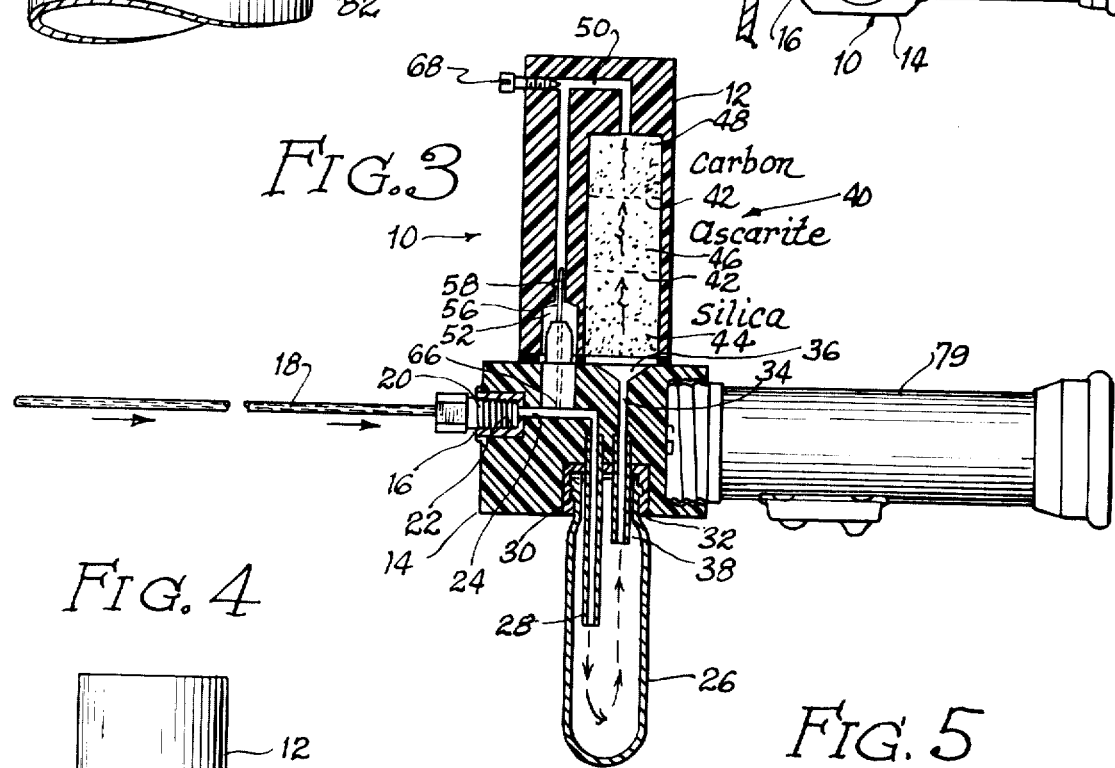
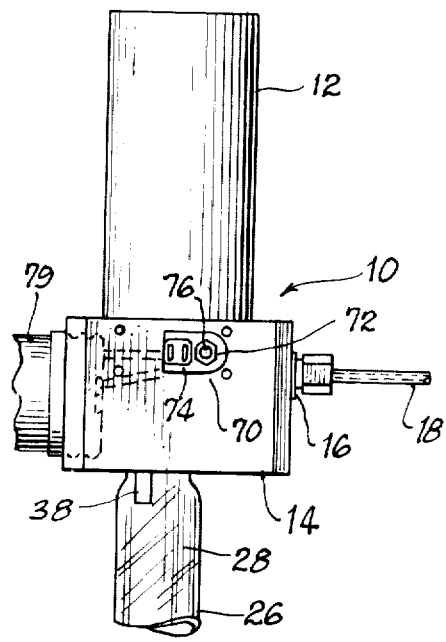
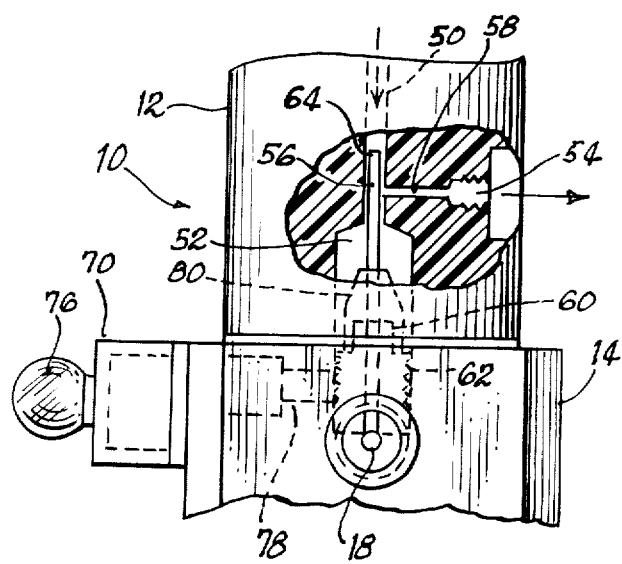

GAS DILUTION APPARATUS

This is a division of application Ser. No. 441,170, filed Feb. 11, 1974, now U.S. Pat. No. 3,853,516.

This invention relates to a fluid dilution apparatus, and more particularly to a gas dilution apparatus for use in taking gas samples from gas streams containing pollutant gases.

In the sampling of gas streams containing pollutant gases, including $SO_2$, $SO_3$, $NO_2$, etc., it is sometimes necessary to dilute the gas stream to facilitate accurate measurements of the pollutant gas content of the stream. This is particularly so where the gas stream contains relatively high concentrations of the pollutant gas, and the high concentration of pollutant gas tends to obscure sensitive measuring and/or detection equipment.

One convenient means to dilute the gas stream is to simply admix the gas stream with a diluent gas to reduce the concentration of the pollutant gas to a level within the sensitivity of the measuring and/or detection equipment being used. However, it is generally undesirable to employ ambient air as the diluent gas because the ambient air may contain a measurable concentration of the pollutant gas which would obviously introduce error into the measurements made as to the pollutant gas concentration. It is difficult to attempt to correct for such error since the concentration of the pollutant gas in the ambient air may be subject to significant variation over the period during which measurements are to be made.

It has therefore been necessary, to avoid the disadvantages stemming from the use of ambient air as the diluent gas, employing a source of a gas which is inert to the analytical system, such as nitrogen, helium, etc. The use of such inert gases is not only expensive, but requires that the equipment include bulky containers for the storage of such inert diluent gases. Moreover, the use of such inert gases involves complex mixing equipment which is difficult to control within the very narrow limits required for accurate analysis.

Gas sampling equipment of the type described is subject to further disadvantages in that the gas streams which are subjected to analysis often contain condensible components, such as water vapor and/or solid particulate matter. It has sometimes been the practice to employ condenser and filtration equipment to remove such components. However, the use of such equipment contributes significantly to the bulk and cost of the gas sampling equipment and frequently to the introduction of error to the analysis.

It is accordingly an object of the present invention to provide fluid dilution apparatus which overcomes the numerous disadvantages described above.

It is a more specific object of the invention to provide fluid dilution apparatus for use in taking gas samples and the like in which the diluent gas is obtained from the gas stream sampled without affecting the concentration of pollutant gases in the sample.

It is a related object of the present invention to provide fluid dilution apparatus for use in taking samples of fluid streams in which the condensible components and/or solid particulate matter can be removed without the need for costly and complex condensation and filtration systems.

These and other objects and advantages of the invention will appear more fully hereinafter, and, for purposes of illustration and not of limitation, an embodiment of the invention is shown in the accompanying drawings in which:

FIG. 1 is a side view in elevation of dilution apparatus embodying the features of this invention;

FIG. 2 is a sectional view taken along the lines 2—2 in FIG. 1;

FIG. 3 is a detailed side view in elevation of the apparatus shown in FIGS. 1 and 2;

FIG. 4 is another side view of the apparatus of FIGS. 1 to 3; and

FIG. 5 is a detailed view, partially in section of the needle assembly of the apparatus of FIGS. 1 to 4.

The concepts of the present invention reside in a compact, portable fluid dilution apparatus which can be used to sample gases from a gas stream containing one or more pollutant gases in which the diluent gas is derived from a portion of the gas stream itself without the need to employ an exterior source of a diluent gas. In accordance with the practice of the invention, the apparatus includes means to draw a gas sample through the apparatus for purification to form a diluent gas, and means to divert a small quantity of the gas sample, prior to purification, through a by-pass circuit for admixture with the diluent gas. The small quantity of the gas sample is diverted at low flow rates whereby the gas sample diverted does not have sufficient energy to entrain solid particulate matter and/or droplets of condensed liquids, and consequently, such components are separated from the gas sample as the small portion is diverted.

In this way, the small quantity of the gas sample which contains the pollutant gas is admixed with the inert diluent gas in controlled proportions to provide a diluted gas stream which can be subjected to analysis and/or monitoring.

Referring now to the drawings for a more detailed description of the invention, there is shown dilution apparatus which embodies the concepts of the invention. The apparatus includes a body generally designated as 10 including a cylindrical portion 12 mounted on a block portion 14. The block portion is provided with gas inlet means 16 which is preferably provided with a gas sampling member 18 in the form of a long, hollow tube communicating with the gas inlet means. The gas sampling tube 18 can be fixed to the gas inlet means 16 by way of a threaded member 20 which is adapted to threadedly engage corresponding threads 22 of the gas inlet means 16.

As is best illustrated in FIG. 3 of the drawing, the block portion 14 of the housing 10 defines first passage means 24 which communicate with the gas inlet means 16 and trap means 26 adapted to collect solid particulate matter and/or condensed liquids. For this purpose, the first passage means can be provided with a tubular member 28 which communicates with the first passage means 24 and extends into the trap means 26. The trap means 26 is preferably a transparent container to enable a visual inspection of the contents thereof to determine when the trap means is full, and can be removably mounted on the block portion 14 of the housing 10 by means of threads 30 adapted to engage a corresponding threaded portion 32 of the block portion 14. In this way, the trap means 26 can simply be removed and emptied when full.

As shown in FIG. 3, the block portion 14 also defines second passage means 34 which also communicates with the trap means 26 and which terminates in a generally conically shaped chamber 36. Second passage means 34 preferably includes a hollow tubular member 38 which extends into the trap means 26 as shown in FIGS. 3 and 4; however, the tubular member 38 preferably does not extend as far into the trap means 26 as does the tubular member 28.

As shown in FIG. 3, the cylindrical portion 12 of the body also includes a gas scrubbing assembly referred to generally as 40. The purpose of the gas scrubbing assembly is to remove all components, including the pollutant gas component of the gas sample to provide a stream of a diluent gas which is inert to the analysis and/or detection system with which the diluter may be used. Consequently, the nature of the scrubbing assembly depends to some extent on the pollutant gas contained in the gas sample.

In the embodiment illustrated in FIG. 3, the scrubber assembly is intended for use with $SO_2$ and/or $SO_3$ systems and includes two or more separate zones. The scrubber assembly illustrated includes three separate scrubbing zones, each of which is separated from the adjacent zones by foraminous supports 42. The first zone 44 is adapted to contain a material which will remove water vapor from the gas stream, and is positioned directly above the conical chamber 36. In the preferred form of the invention, the first zone 44 is adapted to contain silica which, as is known to those skilled in the art, is capable of absorbing water vapor until it becomes wetted. Thus, the silica operates to discharge condensed water vapor as it becomes wet, and the water vapor thus discharged is collected in the conical chamber 36 for passage through the passage 34 to the trap 26.

The second zone as illustrated in FIG. 3 is formed of an adsorbent material which is capable of adsorbing pollutant gases contained in the gas stream and any other reactive components contained in the gas stream. In the preferred practice of the invention, the adsorbent for removing such reactive materials is a material which is capable of adsorbing and/or reacting with acidic components of the gas stream, such as $CO$, $SO_2$, $SO_3$, etc. For example, use can be made of well known adsorbents, such as sodium hydrate-asbestos adsorbent which is marketed by Arthur H. Thomas Co. under the trademark "Ascarite". This material, of course, serves to remove $CO$, $SO_2$, $SO_3$ and like components from the gas stream.

The scrubber assembly is also preferably provided with a zone containing activated carbon as an adsorbent. This zone is shown as 48 in FIG. 3. As will be appreciated by those skilled in the art, the activated carbon serves to remove any other contaminants which may be present in the gas stream. Depending on the composition of the gas stream, the third zone of activated carbon may be dispensed with if desired.

The cylindrical portion 12 of the housing 10 also defines a scrubbed gas passage which communicates with the scrubbing assembly and terminates in a chamber 52, also defined by the cylindrical portion 12. The scrubbed gas passage also is provided with discharge means 54 adapted to be connected to a source of reduced pressure to draw gases through the apparatus, as more fully described hereinafter, for discharge. Discharge means 54 is thus adapted to be connected with analysis or detection apparatus or to a vacuum pump whose discharge is connected to such apparatus.

Positioned in the chamber 52 is needle means 56 which is in the form of a hollow needle, one end of which projects into the scrubbed gas passage 50 past the discharge means 54, as is most clearly illustrated in FIG. 5 of the drawing. As shown in this figure, the discharge means 54 includes discharge passage means 58 bridging the scrubbed gas passage 50 and the discharge 54 to provide communication between the scrubbed gas passage 50 and the discharge 54.

As is also shown in FIG. 5 of the drawing, the needle 56 is mounted on a hub 60 which is threadably engaged at 62 with the block portion 14 of the housing 10. The needle 56 is a double needle and, as described above, one end thereof 64 extends into scrubbed gas passage 50. The other end 66 of the needle extends into the first passage means 24 to permit a small, controlled amount of the gas stream entering the apparatus and containing one or more pollutant gases to pass from the first passage means 24 through the needle 56 and into the scrubbed gas passage 50 where it is mixed with the scrubbed gas; the diluted mixture resulting is consequently drawn out through the discharge means 54 for analysis and/or detection of the gaseous pollutant contained therein.

The cross-sectional area of the needle 56 is of course quite small or restricted as compared to the cross-sectional area of the first passage means 24, and consequently, the bulk of the gases entering the apparatus flows through the first passage means 24. The small amount of the gas stream which does pass through the needle has low kinetic energy which insures that particulate matter and/or droplets of liquids which have condensed in the apparatus are not carried into the needle but are carried along with the bulk of the gases flowing through the first passage means 24 and into the trap 26 in which they settle out by gravity. Thus, the low kinetic energy of the gases passing through the needle effects a separation of solid and liquid components without the need to employ filters or the like.

In the embodiment shown in the drawings, no variable valving means in the needle are shown. However, it will be appreciated by those skilled in the art that adjustable valve means may be provided in the needle if desired. It is sometimes preferable to provide valve means 68 in the scrubbed gas passage to control the flow of scrubbed gases therethrough.

In the most preferred practice of the invention, the hub 62 on which the needle is mounted is formed of metal and includes heating means associated therewith to insure that the plug and consequently the needle are maintained at a temperature above the dew point of the gases passing through the needle. In this way, condensation in the needle is prevented. The heating means is designated 70 in FIGS. 4 and 5 of the drawing in which it is illustrated schematically. The heating means 70 includes a heater 72 which may be a glow plug or the like, and an indicator light 76 to indicate when the heater is operating. Also included is a thermostat 74 to prevent overheating of the needle. As is best seen in FIG. 5, heat from the glow plug 72 is transmitted to the hub 62 by conduction through a suitable heat conductor 78 bridging the glow plug and the hub.

Power for the heating means 70 can be supplied from any convenient source. In the ilustrated embodiment, power is supplied by batteries (not illustrated) contained in a suitable receptacle 79 mounted on the housing 10. The receptacle can conveniently be a flashlight barrel threadably engaged with the block portion 14 of the housing 10. Wiring has not been illustrated for the sake of simplicity of the drawings.

In the preferred practice of the invention, the hub 60 is preferably provided with a layer of insulation 80 to minimize heat losses therefrom. For this purpose it is frequently convenient to wrap or coat the hub 60 with Teflon or like material which is non-heatconductive.

In the use of the apparatus of this invention, the gas sampling member 18 is inserted into a gas stream, such as the gas stream flowing through a stack 82 as shown in FIGS. 1 and 2. A vacuum is applied to the discharge means 54 to draw gases from the gas stream through the gas sampling member 18 and through the inlet means 16 into the first passage means. The bulk of the gas stream containing the gaseous pollutant therein passes through the first passage means to the tube means 28 and into the trap 26 to deposit particulate matter and any liquid droplets which may have condensed from the gas stream. The gas in the trap 26 is drawn thereafter through the tube means 38 and through the second passage means 34 and the scrubber 40 for the removal of pollutant gases and/or any other reactive components in the gas stream. Consequently, the gas which is drawn out of the scrubber assembly through the scrubbed gas passage means 50 is inert with respect to the detection and/or analysis system with which the apparatus of this invention is to be used.

As the gas stream is drawn through the apparatus, a small quantity of the gas stream containing the gaseous pollutants is withdrawn from the first passage means 24 through the needle 56 into the scrubbed gas passage means 50. As indicated above, the needle provides a restricted flow passage in which the gases flowing therethrough have a very low kinetic energy and therefore are incapable of entraining solid particulate matter and/or droplets of condensed liquids. As long as the negative pressure applied to the discharge means 54 remains constant, the volume of flow through the needle remains in a constant proportion to the volume of flow through the scrubbed gas passage means 50 to thereby provide a constant rate of dilution which does not vary with time.

The gas stream containing the pollutant gases therein which passes through needle 56 is admixed with the scrubbed gas drawn through the scrubbed gas passage means 50 for discharge through discharge means 54 for detection and/or analysis.

The apparatus of this invention provides a simple and efficient detection means in which there is no need to employ complex filtration and/or condensation apparatus. The device of this invention is completely portable, compact and lightweight since it is unnecessary to supply an inert diluent gas from any outside source as the inert gas is generated in the apparatus itself.

It will be understood that various changes in the details of construction, operation and use may be made without departing from the spirit of the invention, especially as defined in the following claims.

I claim:

1. Apparatus for diluting fluids comprising a body, gas inlet means for receiving a gas stream containing a pollutant gas, first passage means in the body communicating with the gas inlet means, trap means mounted on the body and communicating with the first passage means to receive the gas stream flowing therethrough, gas scrubbing means adapted to remove the pollutant gas from the gas stream flowing therethrough, via second passage means which communicate with the trap means and the scrubbing means, gas discharge means adapted to be connected to a zone of reduced pressure, scrubbed gas passage means communicating with the scrubbing means and the discharge means and restricted flow passage means extending into the scrubbed gas passage means and extending into the first passage means whereby reduced pressure applied at the discharge means draws the gas stream through the inlet means and through the first passage means to provide flow of the bulk of the gas stream through the first passage means to the trap means and then through the gas scrubbing means for removal of pollutant gas therefrom and to form an inert diluent gas and to provide flow of a small amount of the gas stream containing pollutant gas through the restricted flow passage means to permit admixture of the small amount of the gas stream containing pollutant gas, with the restricted flow passage means including heating means operatively connected thereto to maintain the temperature of the restricted flow passage means above the due point of the gas stream.

2. Apparatus as defined in claim 1 wherein the inlet means includes gas sampling means adapted to be inserted into the gas stream.

3. Apparatus as defined in claim 1 wherein the trap means is removably mounted on said body and is formed of a transparent material to permit visual inspection of the contents thereof.

4. Apparatus as defined in claim 1 wherein the trap means communicates with the first passage means through first tube means and the trap means communicates with the second passage means through second tube means, with the first tube means projecting into the trap means farther than the second tube means.

5. Apparatus as defined in claim 1 wherein the gas scrubbing means includes one or more zones containing a material capable of removing pollutant gas from the gas stream.

6. Apparatus as defined in claim 1 wherein the gas scrubbing means includes three zones, with one zone containing means adapted to remove water from the gas stream, with the second zone containing means adapted to remove pollutant gas from the gas stream, and with the third zone containing means adapted to remove any remaining impurities in the gas stream.

7. Apparatus as defined in claim 1 wherein the gas scrubbing means is positioned in a cavity in the body, with the base of the gas scrubbing means being positioned about a conical chamber adapted to receive liquid from the gas scrubbing means for return to the trap means through the second passage means.

8. Apparatus as defined in claim 1 which includes valve means in the scrubbed gas passage means to control the flow of gases therethrough.

9. Apparatus as defined in claim 1 wherein the restricted flow passage means is a hollow needle having a small cross-sectional area whereby the small amount of gas flowing therethrough has a low kinetic energy to permit solid and liquid components to pass to the trap means.

10. Apparatus as defined in claim 9 wherein the scrubbed gas passage means terminates in a chamber, with the needle being positioned in the chamber extending into the scrubbed gas passage means.

11. Apparatus as defined in claim 10 wherein the needle extends into the scrubbed gas passage means beyond the discharge means.

12. Apparatus as defined in claim 9 wherein the needle is mounted in a hub in the body and the heating means is operatively connected to the hub to maintain the temperature of the needle above the due point of the gas stream.

13. Apparatus as defined in claim 12 wherein the heating means includes thermostat means to prevent overheating of the needle.

14. Apparatus as defined in claim 12 wherein the hub includes insulation to prevent heat loss therefrom.

* * * * *